United States Patent Office 3,773,917
Patented Nov. 20, 1973

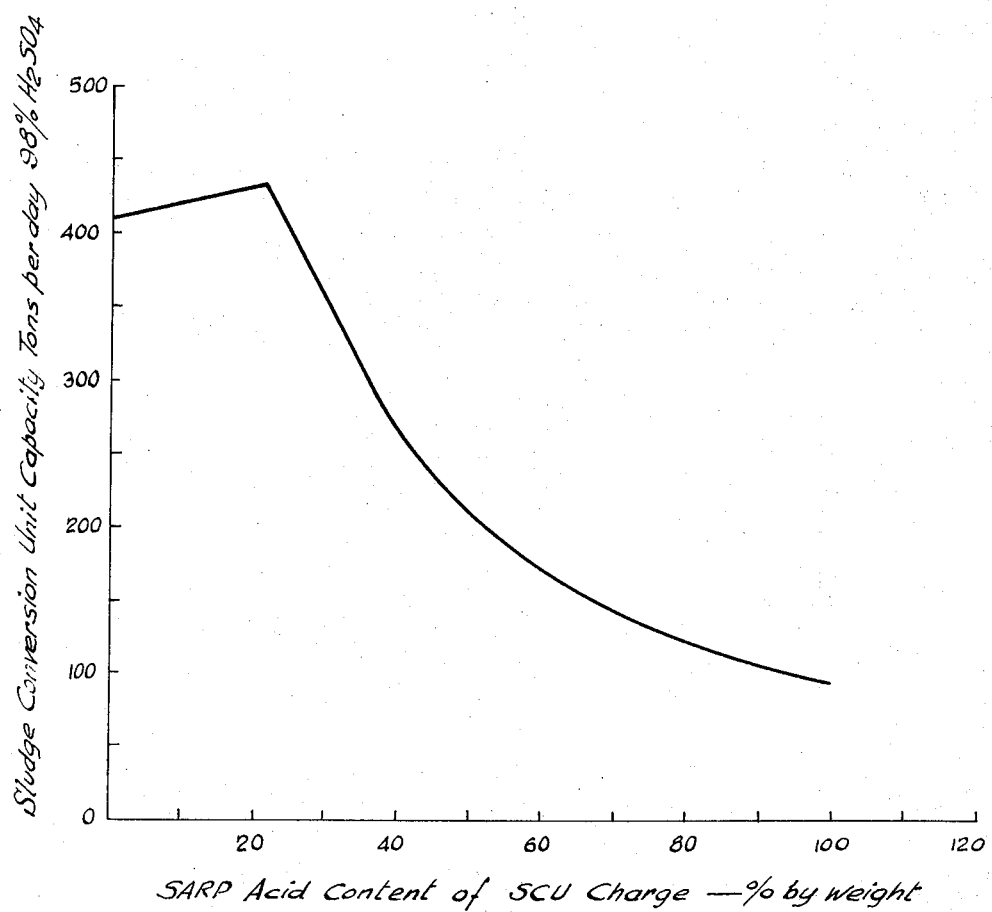

3,773,917
RECOVERY OF USED SULFURIC ACID
ALKYLATION CATALYST
Ralph M. Lewis, Weston, Conn., Charles T. Lewis, Jr., Groves, Tex., and Arthur R. Goldsby, Chappaqua, N.Y., assignors to Texaco Inc., New York, N.Y.
Continuation of abandoned application Ser. No. 837,551, June 30, 1971. This application Nov. 10, 1971, Ser. No. 197,546
Int. Cl. C01b 17/72
U.S. Cl. 423—525
3 Claims

ABSTRACT OF THE DISCLOSURE

Improved method for recovering sulfuric acid from used sulfuric acid containing water and hydrocarbon whereby used alkylation acid is blended with spent acid of relatively high hydrocarbon content obtained by reacting used alkylation acid with an aliphatic olefin to form dialkyl sulfate which is extracted from the spent acid with isobutane. The blend of the two acids is burned in a sludge conversion process and the sulfur values recovered as strong sulfuric acid.

BACKGROUND OF THE INVENTION

Field of the invention

This application is a continuation of Ser. No. 837,551 filed June 30, 1971, and now abandoned.

This invention relates to the recovery of used sulfuric acid and more particularly to the recovery of used and spent acids from the alkylation of isoparaffin hydrocarbons with olefins.

Description of the prior art

Sulfuric acid alkylation of isoparaffins with olefins is described in many articles and patents, and is widely used commercially. Olefins most commonly used for alkylation are propylene, butylenes and amylenes.

Briefly strong sulfuric acid of 98.0 to 99.5% by weight $H_2SO_4$, olefins and isobutane are continuously charged to a reactor with the isobutane in great excess of the olefin. The reaction is carried out at about 30 to 50° F. with efficient mixing. The reaction mixture is withdrawn from the reactor and separated into an acid phase and a hydrocarbon phase. Most of the acid phase is recycled to the reactor but strong sulfuric acid used as a catalyst in the alkylation of isobutane with aliphatic olefins gradually becomes contaminated with water and polymeric hydrocarbons. As a result, the titratable acidity of the sulfuric acid catalyst drops from an original value of about 98.0–99.5% for fresh acid and in order to maintain the system acid at catalytic strength it becomes necessary to withdraw catalyst acid from the alkylation system at a rate sufficient to maintain the titratable acidity of the remaining acid in the system at about 85–92%, usually about 90%. Generally this rate of withdrawal of acid amounts to about 0.3 to 1.0 pound per gallon of alkylate produced. This small amount of withdrawn acid is referred to as used or spent alkylation acid. The composition of the spent acid does not vary appreciably with the olefin used, although the amount of the spent acid does. In general, the hydrocarbon content increases with decreasing titratable acidity. This used acid is recovered. Recovery involves reducing the water and hydrocarbon content thereof. In one method of recovery the used alkylation acid is burned in a sludge conversion unit and the sulfur values recovered as $SO_2$ as will be explained more fully hereinafter. The used acid also may be recovered by means of a procedure termed the Sulfuric Acid Recovery Process (SARP).

The Sulfuric Acid Recovery Process (SARP) is described in U.S. Pats. 3,227,774; 3,227,775; 3,234,301; 3,422,164; 3,428,705; and 3,448,168. In the Sulfuric Acid Recovery Process (SARP), used alkylation acid of about 90% titratable acidity is reacted with an excess of olefin, usually propylene, butylenes and/or amylenes, and preferably the normal olefins, to form dialkykl sulfates. The dialkyl sulfates so formed are then extracted with isobutane and the isobutane-dialkyl sulfate solution is charged to alkylation along with additional isobutane, additional olefin and sulfuric acid catalyst, as described above. It is advantageous to treat the isobutane-dialkyl sulfate solution with used alkylation acid to remove polymeric oil prior to charging it to the alkylation reaction zone. The acid phase remaining after extraction of the dialkyl sulfates, representing only about 10 to 50% of the acid charged to SARP on an equivalent basis, is greatly reduced in sulfuric acid content and increased in hydrocarbon and water contents. In order to recover the sulfur values this spent SARP acid must be further processed in some manner. While used alkylation acid can be recovered quite satisfactorily in a sludge conversion unit, the recovery of spent SARP acid in such units has posed a serious problem in commercial alkylation unit operations. Largely because of the much high hydocarbon content of the spent SARP acid, the capacity of a sludge conversion unit is drastically reduced in relation to its capacity for handling used alkylation acid. As a result, serious penalties are incurred when the spent SARP acid is recovered in such units.

In the case of the used or spent acid from each of these processes, namely the sulfuric acid alkylation process and the Sulfuric Acid Recovery Process, the acid can be recovered, or its water and hydrocarbon contents reduced and its sulfuric acid content increased, by burning it to form sulfur dioxide. The sulfur dioxide is catalytically oxidized with oxygen to sulfur trioxide and the sulfur trioxide is then dissolved in sulfuric acid to make acid of the desired concentration. This type of acid recovery plant is called a sludge conversion unit.

In the operation of a sludge conversion unit it is essential that the combustion chamber be maintained as approximately 1800°–2000° F. for complete conversion of $H_2SO_4$ to $SO_2$ by burning with air. If the acid is too low in combustibles, fuel gas must be added to supply the additional heat required to maintain the temperature at 1800°–2000° F. If the acid is high in combustibles, no fuel gas need be added, but instead, water must be added to remove any excess heat released above that required to maintain the temperature at 1800°–2000° F. Thus, in the case of used alkylation acid which is relatively low in hydrocarbon content, it is necessary to add fuel gas. In the case of SARP acid which is relatively high in hydrocarbon content, it is necessary to add water to keep the combustion temperature down to 1800°–2000° F. In addition when spent SARP acid is being charged to a sludge conversion unit so much air has to be added to obtain complete combustion of the hydrocarbon and acid and consequently significantly more combustion products are formed, that the capacity of a sludge conversion acid recovery plant is severely reduced relative to the capacity of the unit when operated on used alkylation acid.

SUMMARY OF THE INVENTION

We have found that if instead of burning the two acids separately they are blended and burned together greatly improved results are obtained. Accordingly, in accordance with this invention used alkylation acid containing an insufficient quantity of hydrocarbon to adequately support combustion in a sludge conversion unit without the addition of extraneous fuel is blended with Sulfuric Acid Recovery Process spent acid containing an excess of hydrocarbon. The blend of acids is burned in a sludge conversion type of acid recovery operation in the presence of an excess of air to form sulfur dioxide and sulfur dioxide is catalytically oxidized to sulfur trioxide which is then dissolved in sulfuric acid to form strong acid for reuse in alkylation. In accordance with our invention we have found that by mixing from 70 to 95% by weight of used alkylation acid with from 5% to 30% by weight of SARP acid, a blend of acids is achieved which can be burned satisfactorily in a sludge conversion type of acid recovery unit with the addition of little or no extraneous fuel and with little or no extraneously added quench water being required.

With our invention, by using the proper blend of used alkylation acid and SARP acid it is possible to reduce the amount of methane fuel gas required for the combustion step, the need for quench water is eliminated, and the capacity for a sludge conversion unit when charging a proper blend is higher than when charging either acid alone.

BRIEF DESCRIPTION OF THE DRAWING

The figure is a graph showing sludge conversion unit capacity as a function the quantity of SARP acid in used alkylation acid charged to the unit.

DESCRIPTION OF PREFERRED EMBODIMENT

The analyses of used alkylation acid and SARP spent acid vary somewhat depending on operating conditions. Used alkylation acid usually contains about 3 to 5% of water and 3 to 8% of polymeric oil by weight. Acid freshly discharged from an alkylation unit may also contain about 0.5 to 3.0% of alkyl sulfates. The sulfuric acid content or titratable acidity is usually in the range of about 85.0 to 92.0%. Spent SARP acid usually contains about 3 to 8% of water, 8 to 30% of polymeric oil, 1 to 15% of dialkyl sulfate, 35 to 60% of isoalkyl acid sulfate, and 5 to 40% free sulfuric acid. When propylene is used as the olefin charge stock, the isoalkyl sulfate is isopropyl acid sulfate and the dialkyl sulfate is diisopropyl sulfate.

Typical analyses of used alkylation acid and SARP spent acid are as follows:

|  | Weight percent | |
|---|---|---|
|  | Alkylation acid | SARP acid |
| Water | 3.0 | 4.6 |
| Polymeric oil | 6.0 | 15.0 |
| Diisopropyl sulfate | 0.0 | 7.6 |
| Isopropyl acid sulfate | 0.0 | 44.8 |
| Sulfuric acid | 91.0 | 28.0 |
| Total | 100.0 | 100.0 |

A number of acid recovery plants of the sludge conversion type have been designed and installed for the recovery of used alkylation acid. The data in the figure show how the capacity of a sludge conversion unit varies depending upon the composition of the acid charge, as shown by the amount of SARP acid blended with the used alkylation acid.

It will be noted from FIG. 1 that when alkylation acid is charged to a sludge conversion unit the capacity is 410 tons per day of white 98% sulfuric acid per day. As SARP spent acid is blended with alkylation acid over the range of 0 to 22% the capacity of the plant gradually increases up to about 432 tons per day. Beyond 22% of SARP acid in the blend the capacity of the plant decreases to 92.5 tons per day with 100% of SARP acid as the charge. Above about 22% of SARP the SCU capacity drops rapidly, primarily due to the large quench water requirement to maintain an 1800–2000° F. temperature in the combustion chamber, and also due to the nitrogen in the air, and the carbon dioxide formed in combustion. The increase in capacity of the SCU from 410 to 432 tons per day as spent SARP acid over the range of 0–22% is blended with used alkylation acid is due primarily to the higher hydrocarbon content of the spent SARP acid. This higher hydrocarbon content reduces the amount of extraneous methane fuel required for combustion of the acid. This in turn results in the combustibles having a higher carbon-hydrogen ratio due to the higher carbon-hydrogen ratio of propylene or higher olefins as compared with methane fuel.

To summarize, from the data in the figure it can be seen that it is advantageous to blend SARP acid with alkylation acid up to about 22% by weight. Thus we prefer to operate a conventional sludge conversion unit by burning a blend of about 3 to 25% by weight of SARP acid and 75 to 97% of alkylation acid, rather than by burning the acids separately.

Spent SARP acid from a butylene alkylation process has a higher oil content and therefore a somewhat lesser amount of this material is required in a blend with used alkylation acid to give maximum capacity in an SCU.

Obviously, many modifications and variations of the invention as hereinabove set forth, may be made without departing from the spirit and scope thereof, and therefore, only such limitations should be imposed as are indicated in the appended claims.

We claim:

1. In a sludge conversion process for producing sulfuric acid from a sulfuric acid sludge containing water and hydrocarbon wherein the acid sludge is burned with air in the presence of added fuel gas at a temperature in the range of 1,800 to 2,000° F. for production of sulfur dioxide, wherein said sulfur dioxide is catalytically oxidized to sulfur trioxide, and wherein said sulfur trioxide is dissolved in sulfuric acid; the improvement for increasing sulfuric acid capacity and decreasing fuel gas requirement for said sludge conversion process, which comprises:

(a) blending used sulfuric acid alkylation catalyst having a titratable acidity in the range of about 85–92% $H_2SO_4$ and a polymeric oil content of about 3–8% by weight with Sulfuric Acid Recovery Process spent sulfuric acid having a polymeric oil content of about 8–30% and an isoalkyl acid sulfate content of about 35–60% by weight to form a mixture comprising from 75 to 97% by weight used sulfuric acid alkylation catalyst and from 3 to 25% by weight Sulfuric Acid Recovery Process spent acid; and (b) charging said mixture as acid sludge to said sludge conversion unit for production of strong sulfuric acid.

2. The process of claim 1 in which said used sulfuric acid alkylation catalyst has a titratable acidity of about 91% and a polymeric oil content of about 6% by weight, and said Sulfuric Acid Recovery Process spent acid has a polymeric oil content of about 15.0%, and an isopropyl acid sulfate content of about 44.8% by weight.

3. The process of claim 1 in which said blend of used alkylation acid and spent acid contains about 78% of said alkylation acid and 22% of said spent acid by weight.

References Cited

UNITED STATES PATENTS

| 2,406,930 | 9/1946 | Titlestad | 423—525 |
| 3,234,301 | 2/1966 | Goldsby | 260—683.62 |
| 3,477,814 | 11/1969 | Wilson | 423—525 |

OSCAR A. HELLER, Primary Examiner

G. A. HELLER, Assistant Examiner

U.S. Cl. X.R.

423—540